…

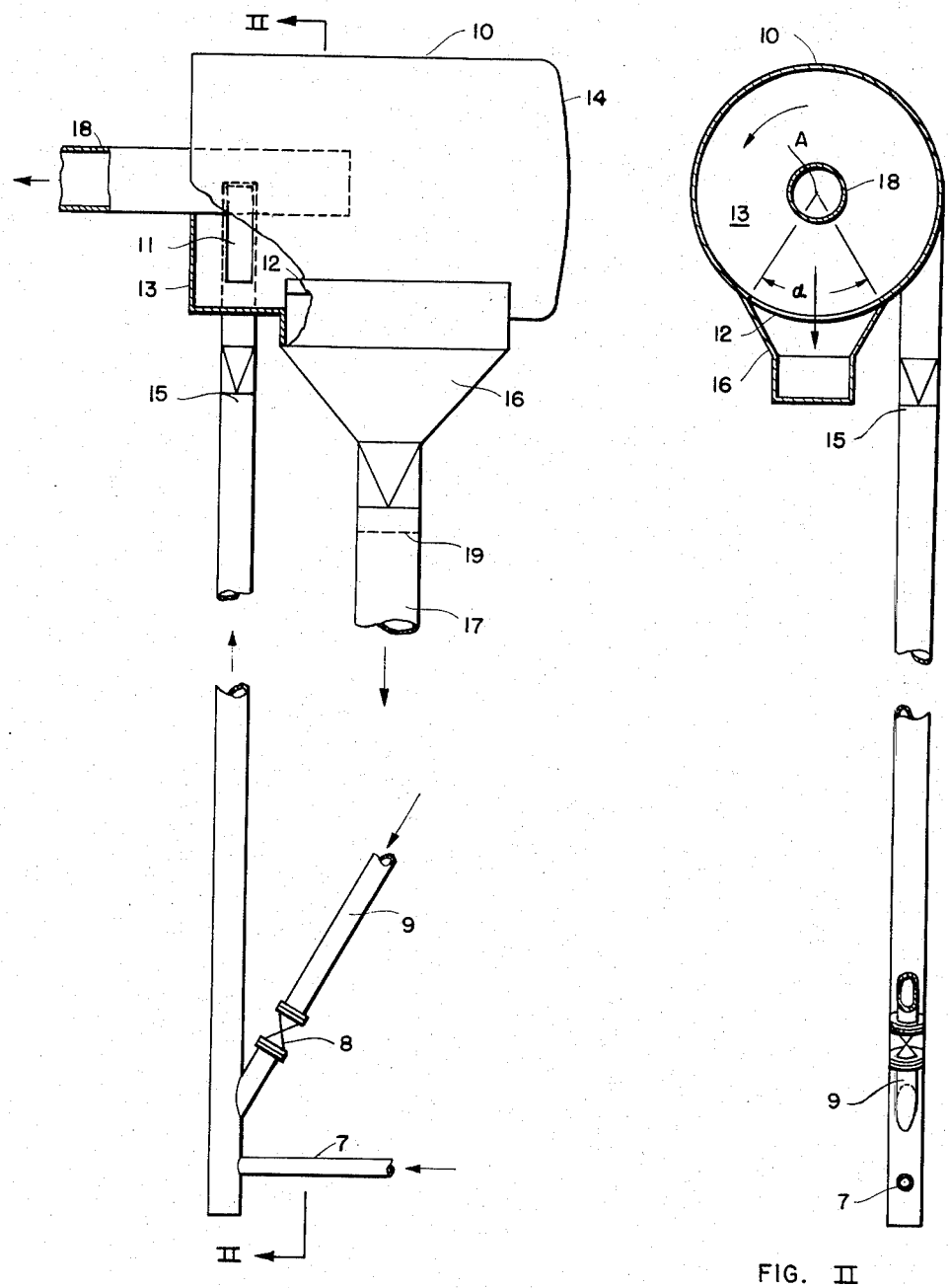

United States Patent Office

2,901,420
Patented Aug. 25, 1959

2,901,420

PROCESS OF SEPARATING CATALYST PARTICLES FROM HYDROCARBON VAPORS

Harry D. Evans, Oakland, Calif., assignor to Shell Development Company, New York, N.Y., a corporation of Delaware Application December 24, 1956, Serial No. 630,187

5 Claims. (Cl. 208—153)

This invention relates to an improved method for effecting reactions in the vapor phase with finely divided solid catalyst in suspension in the reactant vapors. This application is a continuation-in-part of my copending application Serial No. 517,242, filed June 22, 1955, which is directed to apparatus suitable for use according to the present process.

It is well known to catalyze various vapor phase reactions with solid catalyst in a finely divided state, e.g., a powder. In this case the reactant vapors are generally passed up through a bed of the powder. The vapors injected at the bottom of the bed maintain the powder in a so-called fluidized or pseudo liquid state resembling a boiling liquid. That part of the vapors which passes through the bed as "bubbles" is generally under-converted whereas that part of the vapor which is between the individual catalyst particles in the bed is over-converted. This leads to large amounts of side reactions and secondary reactions.

It is known that the efficiency of most vapor phase catalytic reactions of this sort may be increased by effecting the reaction in a long narrow reaction zone wherein the vapor velocity is sufficiently high to maintain the catalyst in suspension and transport it concurrently with the vapors. The velocity required depends upon the particle size distribution, the particle density, and the shape of the catalyst particles. It may be as low as about 4 ft./sec. in some cases but is generally from 8 to 60 ft./sec., preferably at least about 20 ft./sec., e.g., 25 ft./sec. At these velocities the contact of the vapors with catalyst in the reaction zone is relatively short even with a relatively long reaction zone. In order to effect a sufficient conversion, it therefore is the practice to supply to the reaction zone a relatively large flow of catalyst, e.g., 2 to 30 pounds per pound of reactant vapors.

If the catalyst and reactant vapors are passed through a narrow reaction zone which is horizontal or inclined appreciably from vertical, the catalyst tends to move along the lower side of the zone at a slow rate whereas the vapors carrying only a relatively small amount of catalyst pass at a high velocity along the upper side of the zone. This not only affords poor contact but also leads to serious erosion of the reactor. It is therefore preferable to employ a substantially vertical reaction zone, i.e., a riser reactor, which in general is not inclined more than about 20° from the vertical, preferably not over 5°.

It is essential to separate the catalyst from the reaction mixture leaving the reaction zone and this separation is effected by a cyclone-type separator. This requires essentially a 90° turn in the reaction tube before entering the cyclone which turn in general practice is made without any substantial change in linear velocity of vapor and suspended catalyst. The catalyst separated in the cyclone separator is withdrawn by gravity from the bottom of the separator and the reaction vapors are withdrawn from the top.

It is found that at the superficial linear vapor velocities used in the described riser type of operation, the catalyst is thrown to the outside wall of the curve leading to the cyclone inlet. The catalyst tends to collect at the outside wall as a relatively stagnant mass which grows and then slumps off falling as a relatively dense mass down the reactor countercurrent to the rising vapors. It is soon dispersed and carried back up again but part of it is again thrown out by the centrifugal force. The repetition of this creates a circulation of relatively dense catalyst which adversely affects the efficiency in a similar way but to a lesser extent than a fluid bed reactor.

It has now been found that the efficiency of the operation may be further improved beyond that of the conventional method just described. The difficulties indicated may be avoided by discharging the effluent from the vertical reaction zone vertically into an expanded centrifugal field having a horizontal axis of rotation. Based on experience with vertical cyclone separators at the loadings under which they are normally used, this would be expected to afford only a very mediocre separation of the catalyst from the vapors. However, to the contrary, it has been found that at the high loadings used in the riser type reactors described above the efficiency of the separation about a horizontal axis of spin is unexpectedly high. This appears to be due to the fact that at catalyst loadings above about 2 lbs./ft.$^3$ and especially in the range of 5 to 15 lbs./ft.$^3$ the catalyst particles do not behave as discrete suspended particles but as relatively large clumps of particles. Thus, even though the maximum spin of the solids is less than one complete revolution when the axis is horizontal (as opposed to a large number of spins when the axis is vertical) an equally good separation may be obtained at these high loadings.

When carrying out vapor phase reactions in the manner of the invention, a true dispersed phase condition of the catalyst may be obtained from the moment of creating the suspension until the dispersion enters the catalyst separation zone wherein the reactant vapors are separated from the catalyst extremely rapidly, e.g., in less than 2 seconds. Thus, side reactions and secondary reactions are substantially eliminated.

The process of my invention in general terms therefore comprises introducing into the bottom of an elongated vertically disposed and substantially straight reaction zone a material to be reacted and at least two pounds of finely divided solid catalyst per pound of the material to be reacted. The conditions of temperature and pressure and diameter of the reaction zone are such that the reactant is in the vapor phase and the vapor velocity is sufficient to disperse the catalyst and carry the suspension concurrently with the vapors up through the reaction zone. The reaction zone may be of the same diameter throughout its length or it may be narrower in the upper part to counteract loss of vapor velocity due to contraction by the reaction, or it may be wider in the upper part to counteract excessive vapor velocities caused by expansion by the reaction. It should not, however, have any widened section, e.g., near the middle, in which the catalyst can settle to a fluidized bed. The top of the reaction zone discharges vertically and tangentially into a centrifugal separation zone having a horizontal axis of swirl, a bottom drawoff for separated catalyst, and an axial horizontal drawoff for vapors.

In the preferred embodiment of the invention one or more of the following features are combined in the horizontal centrifugal separation zone.

(1) The chamber defining the centrifugal separation zone is connected directly to the riser reactor the upper end of which opens upwardly into the chamber substantially tangentially to the chamber wall. At least the upper half of the chamber wall is shaped generally as a surface of revolution about a horizontal axis. The wall has an underflow outlet opening that is elongated in the direction of the axis (the opening being continuous or interrupted) and is situated below the axis.

(2) The enclosing wall of the centrifugal separation zone has an underflow outlet opening that is elongated in the horizontal axial direction and formed as a gap in the wall that subtends at the axis an angle from about 10° to 180°. It is preferred to shape all parts of the enclosing wall parallel to the axis to conform to a surface of revolution about said axis, as contrasted with providing louvers of bending the downstream edge of the exit slot radially inwards, thereby to avoid eddy currents which harm the separation efficiency. The minimum size of the gap, which may be more or less rectangular in outline and which may be longitudinally continuous or interrupted, will depend upon the loading, viz., upon the quantity of particles to be removed and upon the chamber diameter, somewhat smaller dihedral angles being used with chambers of large diameter. It is desirable that the gap be located to include the position directly below the axis in order to prevent accumulation of particles and induce all separated particles to fall down into the collecting hopper that is provided externally to the centrifugal zone proper. In addition to the main underflow opening there may be additional openings or slots elongated in the axial direction or in an inclined or circumferential direction, establishing additional direct communication between the chamber and the hopper. Such additional slots permit vapors from the hopper to re-enter the chamber, and are advantageously situated in spaced relation to the said main underflow opening in the peripheral direction of fluid flow at a point whereat the vapors are ascending.

(3) When the horizontal centrifugal separation zone is provided with an axial vortex-finder tube entering from the end of the chamber near which the tangential riser reactor line discharges, the length of the vortex-finder tube is made sufficiently long to extend beyond the reactor discharge opening by a distance of at least one-half of the axial dimension of the discharge opening into the centrifugal chamber, but not longer than half the length of the centrifugal chamber.

Suitable apparatus for effecting the improved process are described in my above-mentioned copending application S.N. 517,242. One preferred modification of the apparatus is illustrated in Figures I and II of the accompanying drawing. Figure I is an elevational view and Figure II is the corresponding profile view.

Referring to Figures I and II in detail, 15 is a straight vertical riser reactor line which for example may be 40 ft. long. Reactant, previously heated if desired, is supplied to the riser reaction zone by line 7. Catalyst powder is supplied at a controlled rate to the bottom of the reactor by line 8. The reactant is either introduced as vapor or it is immediately vaporized by contact with the catalyst.

The reference number 10 denotes the enclosing wall of a centrifugal separation zone or chamber having the shape of a cylinder with a horizontal or approximately horizontal axis, except for the inlet opening 11 which is the vertical discharge outlet of the reactor 15, and an underflow solids discharge opening 12 situated wholly below the central axis A of the chamber. The opening 11 is situated near one end of the cylinder. The opening 12 may be rectangular in shape with the latter elongated in the axial direction, as shown. The underflow discharge opening is shown to be a gap that subtends a dihedral angle α to the axis A of about 63°, but other angles from 10° to 90° or even in some cases up to 180° may be used. The underflow discharge opening in this embodiment does not extend the full length of the chamber but one end is terminated just short of the end zone where the inlet opening 11 is situated. The ends of the chamber are provided with closures 13 and 14.

A hopper 16 is mounted externally of chamber opposite the underflow discharge opening 12 to receive the catalyst discharged through the said opening and direct it into discharge duct 17.

The axial overflow outlet includes a vortex-finder tube 18 that extends through a central opening in the end closure 13.

The suspension of finely divided catalyst in the reacted vapors passes from the reactor 15 upwardly and tangentially to the wall 10 to form a vortex. The catalyst is separated during the first cycle of rotation. Substantially all of the suspended catalyst is flung against the chamber wall by centrifugal force and passes through the underflow opening 12 into the hopper 16 during the first cycle. The reacted vapors are displaced in an axial direction away from the inlet (left) end, so that it assumes a helical path.

The duct 17 is provided with suitable flow control means (not shown but known per se) for maintaining the level of catalyst in the hopper at a desired height, indicated at 19. This blocks the flow of any significant amount of gas or vapors out through the hopper 16 and duct 17. Instead, the vapors continue their rotary movement beyond the opening 12 to complete one or more cycles of rotation during each of which a small amount of additional catalyst particles is hurled against the wall 10 and separated through the opening 12. The vapors thereafter make a change in direction and flow through the vortex-finder tube 18 to a suitable recovery system (not shown).

With the arrangement shown the suspension of catalyst in reactant vapors discharges directly from the reaction zone into the separation zone where the catalyst is very quickly separated thus quenching the reaction. More important, the bend in the riser reactor is eliminated and the difficulties noted above are avoided. Contrary to expectation the separation takes place smoothly, quickly, and with high efficiency despite the unusual flow conditions prevailing in the reactor just ahead of or at the entrance to the centrifugal zone. In the reactor, the catalyst particles slip somewhat relative to the vapors and so enter the centrifugal zone at a lower velocity than that of the vapors. Also the catalyst particles are more or less uniformly distributed across the area of the inlet to the centrifugal zone. These conditions are desirable for good catalyst contact but are usually regarded as undesirable for good separation efficiency in comparison with the conditions found in prior vertical cyclone arrangements where the entering suspended matter is concentrated near the outer wall. Nevertheless, very high separation efficiencies well over 99% and generally between 99.5 and 99.98% are obtained. This is due to the factors mentioned including the high loading rates used when effecting catalytic reactions in such systems.

The process of the invention is applicable for effecting all vapor phase reactions which can be catalyzed by a solid catalyst using the fluidized catalyst technique described above or the prior suggested processes using a riser reactor. In these various conversions the catalysts conventionally employed are applicable. The particular catalyst will of course depend upon the particular process. The catalyst is used in a finely divided form such as used in the conventional fluidized catalyst technique, e.g., ground to pass a 100′ mesh standard sieve or in the form of microspheroidal particles of about 1 to 200 microns diameter. Particular reactions are for example the following:

(1) The air oxidation of vapors of naphthalene, alpha methyl naphthalene, ortho-xylene, or durene using a vanadium oxide catalyst.

(2) The isomerization of a paraffin hydrocarbon with a platinum/alumina catalyst in the presence of hydrogen.

(3) The dehydrogenation of naphthene hydrocarbons to the corresponding aromatic hydrocarbon using any of the many known dehydrogenation catalyst, e.g., chromium oxide/alumina.

(4) The dehydrogenation of methyl cyclopentane to methyl cyclopentene and/or methyl cyclopentadiene using a platinum/silica gel catalyst.

(5) The dehydrogenation of lower paraffins to olefins and diolefins, e.g., butane to butenes and butadiene, and of such olefins to diolefins, e.g., butene-1 to butadiene-1,3 using well known dehydrogenation catalysts, e.g., chromium oxide/alumina.

The process of the invention is very advantageous for the catalytic cracking of hydrocarbon oils using the various proprietary cracking catalysts to produce valuable olefins, gasoline, etc. Using the process of the invention, temperatures in the conventional range of 850 to 950° F. can be employed. However, very high cracking temperatures up to about 1125° F. may be used without excessive side reactions. Large yields of valuable olefins and small yields of coke are obtained.

EXAMPLE

A hydrocarbon oil having the properties shown in Table I is catalytically cracked in an apparatus substantially as shown in Figures I and II and having the dimensions shown in Table II.

Table I

| | |
|---|---|
| A.P.I. gravity, 60° F. | 24.4 |
| Pour point, ° F. | 80 |
| Sulfur, percent w | 1.12 |
| ASTM distillation, ° F.: | |
| I.B.P. | 470 |
| 10% | 630 |
| 50% | 730 |

Table II

| | | |
|---|---|---|
| Length of riser reactor | feet | 40 |
| Diameter of riser reactor | inches | 2 |
| Diameter of centrifugal separation zone | do | 7 |
| Length of centrifugal separation zone | do | 12 |
| Underflow outlet, subtended gap angle | degrees | 26 |
| Underflow outlet, length of gap | inches | 9 |
| Axial dimension of tangential inlet | do | 2 |
| Vortex, finder tube length | do | 5.63 |
| Vortex, finder internal diameter | do | 2 |

The catalyst used is a commercial equilibrium synthetic silica-alumina cracking catalyst having an apparent density of 1.5 grams per cubic centimeter, a bulk density of 40 lb./ft.$^3$ and the particle size distribution shown in the following Table III.

Table III

| Diameter, microns | Cumulative weight percent |
|---|---|
| 20 | 0.1 |
| 40 | 15 |
| 60 | 55 |
| 80 | 81 |
| 100 | 93 |
| 200 | 99.8 |

The catalytic cracking is effected at 1000° F. (the heat being mainly supplied by the hot regenerated catalyst and being adjusted by its temperature and the preheat temperature of the oil feed) and substantially atmospheric pressure at variable catalyst and oil flow rates. The separation efficiencies at different flow rates and loadings are shown in the following Table IV.

Table IV

| Riser Reactor Vapor Velocity, ft./sec. | lb. Catalyst/ lb. vapor (approx.) | Separation Efficiency, percent |
|---|---|---|
| 19 | 5.5 | 99.78 |
| 19 | 10.5 | 99.58 |
| 19 | 15.0 | 99.80 |
| 34 | 3.7 | 99.98 |
| 34 | 7.0 | 99.9 |
| 34 | 11.0 | 99.52 |
| 53 | 2.2 | 99.92 |
| 53 | 4.9 | 99.93 |
| 53 | 5.5 | 99.96 |

The gasoline produced, and particularly the lower boiling part thereof, is highly olefinic. A complete analysis of a typical product up through the $C_5$ hydrocarbons is shown in column I of the following Table V; that obtained with the same catalyst under conventional catalytic cracking is shown in column II; and the percentage ratios of the figures in columns I and II are shown in column III.

Table V

| Component | I, percent | II, percent | III, percent |
|---|---|---|---|
| Ethane | 0.35 | 0.55 | 64 |
| Ethylene | 0.20 | 0.20 | 100 |
| Propane | 1.90 | 4.35 | 44 |
| Propylene | 7.30 | 6.50 | 112 |
| Isobutane | 4.15 | 9.80 | 42 |
| n-Butane | 2.00 | 4.65 | 43 |
| 1-butene | 6.30 | 4.35 | 145 |
| Isobutylene | 11.55 | 6.25 | 185 |
| Trans 2-butene | 9.45 | 7.80 | 121 |
| Cis 2-butene | 7.50 | 6.05 | 124 |
| Isopentane | 6.80 | 15.05 | 45 |
| n-Pentane | 1.15 | 2.50 | 46 |
| 3-methyl butene | 1.30 | 0.55 | 237 |
| 1-pentene | 4.75 | 3.45 | 138 |
| 2-methylbutene | 8.60 | 4.70 | 183 |
| Trans 2-pentene | 7.25 | 5.50 | 132 |
| Cis 2-pentene | 3.95 | 3.80 | 140 |
| 2 methyl 2-butene | 13.35 | 13.40 | 99 |
| Unknown | 4.30 | | |

I claim as my invention:

1. In effecting a catalytic reaction of reactant material in the vapor phase with a finely divided solid catalyst wherein the finely divided solid catalyst in an amount of at least two pounds per pound of reactant is dispersed by the reactant vapors in an elongated transfer line reaction zone and passed through said zone under reaction conditions of temperature and pressure and at a velocity sufficiently high to prevent settling of the catalyst in said zone, the improvement which comprises passing said suspension in a vertical straight line path into an enlarged horizontally disposed centrifugal separation zone near one end thereof, withdrawing separated catalyst from said horizontal separating zone from a point below the axis thereof and withdrawing reacted vapors substantially free of catalyst horizontally from within said centrifugal separation zone at a point on said axis horizontally displaced from the point of entry of said suspension whereby the reacted vapors and catalyst are contacted for a short reaction time with rapid mechanical separation at the end of said short reaction time without any curvature in the line of flow which tends to concentrate and delay the catalyst by centrifugal action prior to entering said enclosed centrifugal separation zone, the enlarged centrifugal separation zone comprising an unobstructed horizontal annular centrifugal separating space disposed about and separated from a horizontally disposed tubular zone in open-end communication with said annular space and with the exterior of said centrifugal separating space, the linear velocity of the suspension entering vertically and tangentially into said horizontal annular centrifugal separating space being between about 8 and 60 feet per second and the separated catalyst being withdrawn downwardly from the horizontal centrifugal separation zone through an axially elongated area subtending a dihedral angle of 10–90° at the axis of said horizontal centrifugal separating space.

2. A process according to claim 1 wherein the linear velocity of the suspension entering said separation zone is from 20 to 60 feet per second.

3. The process according to claim 1 wherein the enlarged centrifugal separation zone comprises an unobstructed horizontal annular centrifugal separating space disposed about and separated from a horizontally disposed tubular zone in open-end communication with said annular space and with the exterior of said centrifugal separating space and wherein the linear velocity of the suspension entering vertically and tangentially into said horizontal annular centrifugal separating space is between about 20 and 60 feet per second and wherein the separated catalyst is withdrawn downwardly from the horizontal centrifugal separation zone through an axially elongated area subtending a dihedral angle of around 26° at the axis of said horizontal centrifugal separating space.

4. The process according to claim 1 wherein the reactant material is an aliphatic $C_4$ hydrocarbon containing at least eight carbon atoms per molecule which is dehydrogenated to a less saturated $C_4$ hydrocarbon using a solid dehydrogenating catalyst.

5. The process according to claim 1 wherein the reactant material is a hydrocarbon oil which is cracked at a temperature between about 850 and 1125° F. with a finely divided silica-alumina cracking catalyst.

References Cited in the file of this patent

UNITED STATES PATENTS

| | | |
|---|---|---|
| 2,259,486 | Carpenter | Oct. 21, 1941 |
| 2,396,109 | Martin | Mar. 5, 1946 |
| 2,448,553 | Schutte et al. | Sept. 7, 1948 |
| 2,672,871 | Slovic | Mar. 23, 1954 |
| 2,727,810 | Leffer | Dec. 20, 1955 |

FOREIGN PATENTS

| | | |
|---|---|---|
| 255,948 | Switzerland | July 31, 1948 |